United States Patent Office 2,701,188
Patented Feb. 1, 1955

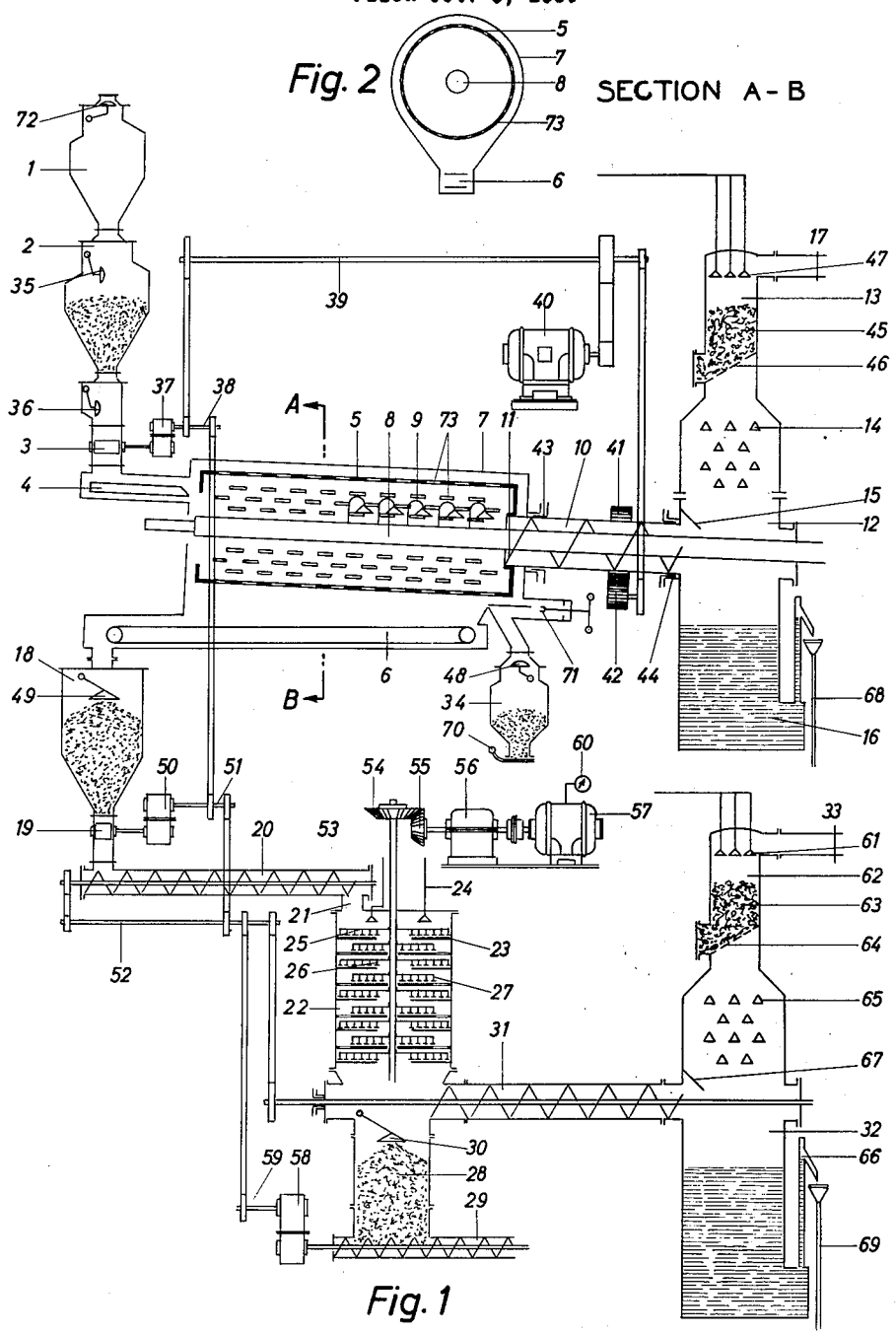

2,701,188

APPARATUS FOR THE CONTINUOUS
MANUFACTURE OF ACETYLENE

Friedbert Ritter, Knapsack, Bezirk Koln, and Felix Walter, Koln-Klettenberg, Germany, assignors to Knapsack-Griesheim Aktiengesellschaft, Knapsack, near Cologne, Germany, a corporation of Germany Application October 3, 1950, Serial No. 188,260

Claims priority, application Germany October 10, 1949

3 Claims. (Cl. 48—48)

The subject of the present invention is an apparatus for the continuous manufacture of acetylene from calcium carbide and water with the simultaneous production of dry calcium hydroxide. This process for the manufacture of acetylene from calcium carbide and water with the simultaneous production of dry calcium hydroxide, in which the heat of reaction is carired off by the evaporation of a certain surplus quantity of water and the generation is carried out with continuous separating off of the fine-grained reaction components, comprises, inter alia, the decomposition of the carbide in two stages which are independent of each other. In the first stage of generation, besides the calcium hydroxide formed, the fine-grained carbide is continuously separated off, and the acetylene formed by the decomposition of the carbide with water in the first stage of generation and the acetylene formed in the second stage of generation by the decomposition with water of the fine-grained carbide contained in the calcium hydroxide separated off are carried away in two measurable gas currents which can be adjusted to any desired temperature by direct water cooling of the gases. This is achieved by the uninterrupted formation of a gas-tight sealing formed by the calcium hydroxide and carbide obtained in the first stage. This sealing should have a certain minimum material level, of two meters for example, so that two independent gas chambers are formed in one generating apparatus. This sealing is continuously formed anew by the calcium hydroxide separated off during the carbide decomposition in the first stage of generation and the undecomposed fine carbide occurring through friction during this stage, but the solid reaction mixture is not coming into contact with the outside air.

As a generator for the first stage all those gas developers may be used which permit a good mixing and agitation of the calcium carbide and at the same time the easy separating off of the fine-grained components and of the reaction products, thus, for example, rotating drums, possibly slightly inclined, equipped with sieves, bars, grates, slits, holes, etc. For the first stage of generation it is, however, also possible to use regularly or irregularly agitated sieves of either flat or arched design consisting of mesh wire, bars, grates, slotted or perforated plates, etc., thus, for example, apparatuses which can effect swinging, agitating, shaking, vibration, or other movements.

It is also possible to use for the first stage of generation apparatuses by which the lighter reaction products obtained during the carbide decomposition and the fine-grained components are separated from the more coarse-grained carbide by means of a separating gas current. The separating gas current can be produced by cycling acetylene.

In order that two gas currents independent of each other are produced which can be cooled down separately and measured continuously, the fine-grained material separated in the first generator which consists of calcium hydroxide and carbide dust, is used for the formation of an uninterrupted sealing with a certain minimum level. Whether the fine-grained material for the formation of the sealing is carried upwards by means of a suitable conveying apparatus, or whether it goes directly downwards by falling into a container is in principle immaterial. But, if factory conditions permit, the latter method would be more advantageous.

In order to render the two generators as independent of each other as possible it is of advantage to design the container serving as sealing so large, that an adequate quantity of material can accumulate and act as stock or buffer, respectively. It is advisable to install beneath this material container an apportioning device, such as an adjustable bucket wheel, which conveys the material to the second stage of generation in the desired quantities. After the coarse-grained carbide has been decomposed in the first generation stage by treatment with water, the calcium hydroxide thus formed and the fine-grained carbide produced through friction arrive together in the container serving as sealing as described above. After the dust particles carried over by the gas have been removed, and after direct water cooling to the desired temperature, the acetylene produced in the first apparatus is introduced into a gas measuring device, e. g., a flow meter, which indicates the quantity of acetylene produced hourly. The regulation of the quantity of water necessary for the decomposition of the carbide in the first stage of generation is effected in the known manner in consideration of the quantity of acetylene produced at the moment. For the second generation stage all acetylene developers come into consideration in which a good mixing of the reaction material is effected, such as, e. g. mixing worms, rotating drums, or plate apparatus designed on the line of a Wedge oven. In the second stage the introduction of the water necessary for the decomposition of the residual carbide and the carrying off of the heat of reaction, the water is introduced in appropriate form, preferably in the form of a fine mist, atomized through nozzles.

Before a more specialized generator is described in closer detail, it should be pointed out once again that the simple combination of the two apparatuses described later, which are partly known, does not lead to a solution which is serviceable in practice, since unnecessary losses of gas and above all great danger of fire would occur. In order to prevent silting up and clogging of the slits of the drum provided as the first stage of generation, the decomposition of the carbide, as with all other known generators equipped with sieving devices, must be carried out at temperatures of 100° C., and over. As already stated, from this temperature onwards acetylene easily forms a gas mixture with air which is ignited by the hydrogen phosphide which is always present in crude acetylene. This danger, which exists even with the use of normal sorted carbide with a low dust content, is very considerably increased when unsorted carbide is used in which as high a content of carbide dust as possible is consciously striven after.

The obvious measure of excluding the air from the calcium hydroxide with carbide dust content obtained in the first generator by means of a protective gas does indeed diminish the danger. But it has the disadvantage that unnecessary expenses are thus incurred and that the protective gas dilutes the acetylene in an undesirable manner.

Only through the new type of measures embodied in the present invention, whereby a sealing is formed by the solid fine-grained reaction products within the common generating apparatus, it is possible for the first time to prevent the danger and disadvantages completely and at the same time to achieve a great technical advance in that both expensive crushing of the carbide, attended by losses of gas, and a sorting of the broken carbide can be dispensed with.

As generation apparatus all the devices detailed above can be used, but a combination of slit drum for the first stage of generation and plate apparatus on the lines of a Wedge oven for the second stage has shown itself to be particularly suitable.

But the present invention should not be restricted to this particular combination. As apparatus for the continuous manufacture of acetylene from calcium carbide and water with the simultaneous production of dry calcium hydroxide, the heat of reaction developed being carried off with water and the decomposition carried out with continuous separating off of the fine-grained reaction components, an installation is employed which consists of two apparatuses independent of each other. The first generation apparatus, in which mainly the coarse-grained carbide is decomposed, consists of a rotating drum provided with narrow slits distributed over the whole surface. This is surrounded by a fixed gas-light casing tapering off conically at the bottom, in the lower part of which a conveying device is installed for the calcium hydroxide and the fine-grained carbide falling through the narrow slits. This fine material is thrown into a large container, and a certain minimum level is continuously maintained. In the centre of the rotating slit drum the water necessary for the decomposition of the carbide is distributed in finely dispersed form through several water nozzles arranged in that part of the rotating drum opposite the inlet device for the carbide, arranged along the whole length of the drum, and the acetylene thus produced is cooled down to the desired temperature by direct treatment with water after the particles of dust carried over with the gas have been separated off. The acetylene is measured in a measuring device of the flow meter type. The fine-grained carbide-containing material which is separated through the drum slits is conveyed to a material container serving as a gas sealing, and is carried to the second generation stage by means of an apportioning device which can be regulated at will. This second generation apparatus consists of various plates arranged one beneath the other in the manner of a Wedge oven for inner and outer transport with rotating agitating arms installed thereon with shovels and clearance devices for the inner circular-shaped and outer ring-shaped fall-through apertures of the plates. Above the uppermost plate there are various water nozzles installed for the introduction in finely dispersed form of the quantity of water necessary for decomposing the carbide. All of the calcium hydroxide resulting from the carbide decomposition in both generation apparatuses is then conveyed into a sluice for the calcium hydroxide formed of a certain size and equipped with a heating jacket, which is installed under the plate apparatus. Through the calcium hydroxide and the undecomposed fine carbide a gas-tight sealing of a certain minimum level is continuously formed, and this level is constantly checked by a suitable level measuring device. From the upper part of the sluice the acetylene produced in the second generation apparatus is passed through a pipe equipped with a clearance screw and a heating jacket, freed from the dust particles carried over with the gas, and cooled down by direct water cooling in a suitable device. The measuring of the gas current is effected by means of a measuring device of the flow meter type.

In order to be able to determine the quantity of water necessary for the decomposition of the carbide in the slit drum, the quantity of acetylene produced at the moment in this drum, which can be read off from the flow meter, can be used. But if suitable temperature indicating devices, such as electric thermometers, are arranged in the vicinity of the water nozzles, the regulation of the water will be considerably simplified. If each water nozzle has its own individual piping fitted with a quantity meter, the addition of water can be increased or decreased according to the temperatures occurring in the various parts of the drum.

An expedient width for the slits of the drum is 2–3 mm., so that only fine-grained carbide, which is decomposed very swiftly owing to its large relative surface, arrives at the second generation apparatus. An operational advantage is derived in repairing and cleansing if the slits of the drum are provided on easily interchangeable plates. As a minimum height for the substance sealing, which separates the gas chambers of the two generation apparatuses from each other, a material level of about 2 meters is suitable; this must be constantly maintained. If smaller slits are selected for the drum, e. g. 1–2 mm., then finer material is obtained for the sealing. In this case the minimum level may be regarded as about 1½ meters.

The expenses for the further comminution of the initially broken carbide blocks—which is mostly done in mills and is attended by inevitable losses of gas—and also the sorting of the carbide can be dispensed with if the broken, unsorted carbide is used directly for the production of the acetylene. It is even possible in the present apparatus to treat carbide with a strong carbide dust content such as is obtained with comparatively low expenditure of current in the "Symmons" crusher or similar comminution machines.

In these cases it is advisable to add the water for the decomposition of the carbide in the first generation stage not before the second third or quarter of the drum length, so that the carbide in the first third or quarter of the slit drum is sieved off undecomposed and is not decomposed until the second generation stage. By this means thrusts of gas in the drum are avoided and the generation is carried out in greater safety.

With the generation apparatuses hitherto normally used it is not possible to decompose unsorted carbide with so high a carbide dust content in safety. Since in the transporting of this carbide the material becomes almost completely demixed owing to the vibration, almost all of the carbide dust lies on the bottom of the conveying apparatus. The same phenomenon occurs when filling this carbide into the gas-tight carbide container situated over the generator, so that periodically almost dust-free carbide and carbide with a very high dust content is introduced into the generator. This results in periodically occurring very strong thrusts of gas, which are to be accounted for by the extremely high speed of the decomposition of the dust carbide which possesses a very large relative surface.

With the new generation apparatus these dangers are completely avoided, since in the first part of the slit drum a sieving off of the dangerous carbide dust can be effected before it is decomposed with water. This undecomposed carbide dust is thrown into the transport device installed beneath the rotating slit drum, which is expediently designed in the form of a spiral mixing screw, and is conveyed into the plate apparatus, together with the calcium hydroxide developed in the drum, via the substance sealing and an adjustable apportioning apparatus. Since the material, besides calcium hydroxide, contains much carbide dust, its decomposition speed is very great. As a result of this it is sufficient to add the total quantity of water necessary for the decomposition of the carbide and for the taking off of the heat of reaction to the first plate only. The addition of water is carried out by means of several atomizing nozzles. On this plate the greater part of the carbide is decomposed in a very short time. The non-reacted particles of carbide decompose completely on the further plates in the calcium hydroxide, which contains small quantities of moisture, thus drying the calcium hydroxide. Since the quantity of acetylene developed at the moment can be read off from the flow meter, it is comparatively simple to ascertain the quantity of water necessary for the decomposition of the fine carbide. But this determination can be considerably simplified still further, if the force which the agitator absorbs is constantly observed. This force can be measured, for example, by selecting a worm drive for driving the agitator and transferring the movement of the worm shaft onto a sensitive diaphragm. The resulting variations in pressure can be read off on suitably sensitive manometers. But it is also possible to use a separate motor for driving the agitator, the momentary current consumption of which can be read off on a sensitive kilowatt meter. If too much water is added to the carbide the force absorbed by the agitator increases; if too little water is added the reaction mixture attains a flowing condition, and the force absorbed by the agitator decreases sharply.

By this method the quantity of water necessary for the decomposition of the carbide can be easily determined, particularly if at the same time the quantity of acetylene produced in a unit of time is taken into consideration.

In order to avoid losses of gas in the discharging of calcium hydroxide from the sluice which is situated under the plate apparatus a gas-tight sealing must be maintained continually in the sluice. The level of the calcium hydroxide should be at least two meters. The size of the sluice is best determined by providing that the calcium hydroxide can stay in the sluice for at least half an hour when the generator is operating at its peak capacity. The result of this is that even when using carbide which decomposes very slowly the calcium hydroxide is absolutely free from carbide on leaving the sluice. The measurement and control of the calcium hydroxide level is effected by a pendulum with a large contact surface slowly swinging to and fro. This motion can be conveyed to a measuring scale outside the generator by means of levers, etc. If the level of the calcium hydroxide sinks below the desired level of two meters, for example, then the rotation of the calcium hydroxide discharge worm is decreased; if the calcium hydroxide surmounts the desired level, then the rotating number of the calcium hydroxide discharge worm is increased. The level control can be effected automatically in the known manner.

In the attached drawing bearing Figs. 1 and 2 this particularly suitable generation apparatus is illustrated in more detail.

Figure 1 shows a vertical section, Figure 2 a cross section along the line A—B of Figure 1. In Figure 2 the single numerals have the same meaning as in Figure 1.

The unsorted carbide is conveyed via the carbide container 1 which is provided top and bottom with ball closures 72 and 35, to the carbide container 2 situated beneath with the ball closure 36 which is closed only if the generator is put out of operation. The carbide is carried continuously by the adjustable apportioning bucket wheel 3 which is driven by the regulating gear 37 by means of transmissions 38 and 39 by the motor 40 via the carbide shaking channel 4 (the motor of which is not shown in the drawing) into the rotating, slightly inclined drum 5 which is equipped with slits 2–3 mm. wide over the whole of its surface. A large part of the fine-grained carbide and dust falls undecomposed through the slits 73 of the drum 5 directly into the transport device 6. The movement of the said transport device 6 takes place by means of the transmission 39. The details are not shown in the drawing. The transport device 6 is situated beneath the sieve drum 5 and also acts as a mixing apparatus. The addition of water to the carbide is only made from the first third of the slit drum 5 outwards. The calcium hydroxide formed in the drum 5 by the decomposition of the carbide and any fine carbide remaining undecomposed are also thrown through the drum slits into the transport apparatus 6. The rotating sieve drum 5 is encased in a gas-tight stationary jacket 7, which tapers conically towards the bottom so that the transport device 6 forms the base of the stationary jacket 7. The addition of water for the decomposition of a large part of the carbide introduced is distributed by atomizing nozzles 9 fed through the hollow stationary shaft 8 onto the carbide present in the drum 5. For each nozzle 9 a separate piping is provided, which is not illustrated in the drawing; the individual pipings are combined in one tube. The nozzles 9 can be controlled individually and the water for each one can be measured, so that it is possible to adjust the supply of water to the manufacturing conditions. This is made still easier by sliding contact thermometers installed in the vicinity of the nozzles 9 for measuring the reaction temperature. These thermometers are not represented in the drawing. The acetylene developed in the drum leaves the slit drum 5 through the tube 10, which is equipped with a stationary clearance screw 11, in order to prevent clogging. The rotating drum 5 which is connected to the tube 10 is kept in slow motion by this tube 10; the tube 10 and the drum 5 rotate with 2–5 revolutions per minute. The tube 10 itself is driven by the toothed rim 41 driven by means of the small toothed wheel 42 by means of the general transmission 39. The number of revolutions of tube 10 and the number of revolutions of the rotating drum 5 may, if desired, be adapted to the working conditions by means of an interconnected regulating gear, not illustrated in the drawing. The tube 10 is sealed against outside air by stuffing boxes 43 and 44 indicated in the drawing, or other suitable devices. The clearance screw 11 is stationary so that it acts as scraper; it is fixed to the stationary hollow shaft 8. The acetylene is then introduced into the washing tower 12 in which it is freed from dust and hydrogen sulfide carried over with the gas by means of spraying with lime water. Here any particles of carbide possibly carried over with the gas are decomposed. The cooling down of the gas to the desired temperature is effected in the cooling tower 13 installed above the washing tower 12. The cooling tower 13 contains the filling material 45 which is deposited on the removable grate 46. The lime water is cycled by pumps, purified in settling tanks, and, by means of the distributing elements 14, which can be easily interchanged during operation and which are insensitive to clogging owing to their construction, the water being well distributed over the cross section of the washing tower 12. In order to prevent the penetration of the washing water into the rotating drum 5, the deflecting plate 15 is installed in the washing tower 12. The washing water leaves the tower 12 via the water seal 16 and is recycled. The quantity of gas developed hourly, after it has been brought down to the desired temperature by direct cooling with water in the cooling tower 13 by means of atomizing nozzles 47 is measured by a flow meter or a baffle plate 17.

By observing the quantity of gas developed hourly and the temperatures measured at the individual measuring points, and by considering the quantity of carbide introduced in the unit of time, the hourly quantity of water for the decomposition of the carbide is calculated and adjusted. The fine carbide and the mixture of calcium hydroxide and carbide discharged from the slit drum 5 are conveyed via the transport and mixing device 6 into the storage container 18, situated beneath. By the adjustment of a certain minimum level of material of about 2 meters—the level measuring device 49 is described later for the sluice 28 situated beneath the plate apparatus 22—the gas-tight sealing can be obtained with certainty. This may also work automatically, so that the operator has only to compensate for any variations in the supply of material by corresponding regulation of the water supply. From here the material mixture is conveyed via the adjustable bucket wheel 19 which is driven by the regulating gear 50 by means of the transmission 51, and the worm conveyor 20, which is driven by transmission 52 through the aperture 21 into an acetylene developer 22 designed as a plate apparatus. This generator consists of several round plates 23 arranged one beneath the other on the lines of a Wedge oven.

The total quantity of water necessary for the decomposition of the remaining carbide and for carrying off the heat of reaction is delivered onto the topmost plate of the plate apparatus 22 by various atomizing nozzles 24, and the material is gradually transported through the whole developer 22 with the aid of agitator arms 25, which are driven from the shaft 53 by means of the worm gears 54 and 55 and the reducing gear 56 by the motor 57. The agitator arms 25 are equipped with obliquely adjusted shovels, the material being moved on the individual plates from the outer edge inwards or from the center outwards, respectively. If for certain reasons the width of the slits 73 in the slit drum 5 is greater than 2–3 mm. and the material falling through thus of a correspondingly coarser grain, it may possibly prove advisable to add a small part of the water necessary for the decomposition of the carbide to the 2nd and 3rd plates also. In order to prevent clogging of the inner openings of the plates, clearance shovels 26 are installed which grasp over the edges of the plates. In order to prevent clogging of the outer, ring-shaped openings similarly constructed shovels 27 are employed. As a result of the relatively large surface which the fine carbide possesses as compared with the coarser one, the carbide decomposes in a very short period and arrives free from carbide in the sluice 28 located beneath the last plate. But in order to ensure the continuous absence of carbide from the calcium hydroxide even when slowly decomposing the carbide, it is left for at least ½ hour in this sluice 28 according to the generation capacity of the developer 22, and is transported from the sluice 28 by the worm 29, the number of revolutions of which is adjustable by means of the regulating gear 58 which is driven by transmission 52 over the belt pulley 59. The regulation of the water for the decomposition of the residual carbide in the calcium hydroxide carbide mixture is effected in the manner described by relating the quantity of acetylene developed hourly to the quantity of calcium hydroxide carbide fed in hourly, considering also the kilowatt consumption consumed by the driver 53, which consumption can be read from the kilowatt meter 60 of the driving motor 57. For each individual generation capacity and for each type of generator it is easy to determine by experiment what the kilowatt consumption of the agitator motor should be for a certain desired contact of free water in the calcium hydroxide. For example, if this consumption is 18 kw., then, if the current consumption is greater, say 19.5 kw., the addition of water must be correspondingly reduced, and vice versa. In order to prevent the acetylene from escaping into the open the calcium hydroxide in the sluice 28 is always maintained at a certain level of at least two meters. The measurement of the calcium hydroxide level is effected by the periodically swinging pendulum 30, ending in a plate. The motion of the pendulum 30 and thus the level of the calcium hydroxide in the sluice 28 is transmitted by a shaft to a graduated scale and/or automatically to a recording mechanism for checking purposes. Other measuring devices can of course also be employed. It is also possible to couple the adjustment of the calcium hydroxide with the discharge of the calcium hydroxide. The calcium hydroxide dust carried over with the gas developed is for the most part separated off in the upper extended part of the sluice 28 by considerable reduction of the speed of the gas current, and the acetylene leaves the developer 22 through the pipe 31, and is purified of the last remaining dust and of hydrogen sulfide in the washing tower 32. The measurement of the quantity of gas developed hourly is effected by a baffle plate 33, after the gas has been cooled down to the desired temperature by direct cooling by means of atomizing nozzles 61, in the second washing tower 62, filled with filling materials 63. The latter are deposited on a removable grate 64. Irrigation of the tower 32 is effected by means of distributing devices 65. The consumed water flows off over the siphon 66. The deflecting plate 67 prevents the entering of the water into the worm 31. 68 and 69 are the discharge funnels for the consumed water. The ferrosilicon which gradually accumulates in the slit drum 5 of the first stage of generation can be dropped from the slit drum 5 after a brief switching off of the apparatus at certain intervals into a sluice 34 arranged underneath the sieve drum 5 and provided with gas-tight closures top 48 and bottom 70. By means of the scraper 71 it is possible to remove cloggings in the exit.

The new process herein described is claimed in our copending application Serial No. 188,261 filed concurrently herewith.

We claim:

1. A two-stage apparatus for continuously converting unsorted broken calcium carbide into acetylene and dry calcium hydroxide by means of water, wherein the amount of the acetylene produced in each stage can be measured separately and used to control accurately the dosage of water to each stage, which apparatus comprises in combination a feeding device adapted to feed the unsorted broken calcium carbide into a rotatable horizontally inclined drum provided with perforations allowing the fine-grained calcium carbide to pass through the perforations and retaining the coarse-grained calcium carbide, said drum being arranged inside a stationary gas-tight casing, water atomizing nozzles arranged inside the drum, an outlet in the casing for the acetylene produced, another outlet for the calcium hydroxide and calcium carbide in the lower part of the casing, a conveyor for transporting the calcium hydroxide and calcium carbide into the container, said container being adapted to store such a quantity of the calcium hydroxide and calcium carbide passing therethrough as to seal gas-tightly the casing, the lower part of the container being provided with a conveyor for transporting the calcium hydroxide and calcium carbide into a second generator equipped with nozzles for atomizing water therein, said second generator being provided with an outlet for the acetylene produced and another outlet in its lower part for the dry calcium hydroxide produced, both outlets for the acetylene produced in the separate stages being provided with measuring devices.

2. A two-stage apparatus for continuously converting unsorted broken calcium carbide into acetylene and dry calcium hydroxide by means of water, wherein the amount of the acetylene produced in each stage can be measured separately and used to control accurately the dosage of water to each stage, which apparatus comprises in combination a feeding device adapted to feed the unsorted broken calcium carbide into a rotatable horizontally inclined drum provided with narrow slits distributed over the whole of its surface, said drum being arranged in a stationary gas-tight casing tapering conically towards the bottom, water atomizing nozzles arranged inside the drum along about two thirds of the drum length removed from the feeding device, an outlet in the casing for the acetylene produced, another outlet for the calcium hydroxide and calcium carbide in the lower part of the casing, a conveyor for transporting the calcium hydroxide and calcium carbide into a container, said container being adapted to store such a quantity of the calcium hydroxide and calcium carbide passing therethrough as to seal gas-tightly the casing, the lower part of the container being provided with a conveyor for transporting the calcium hydroxide and calcium carbide into a second generator including a plurality of horizontal plates arranged one below the other, rotating agitator arms equipped with shovels and clearance devices for the inner circularly shaped and outer ring-shaped apertures of the plates, said second generator being adapted to move the calcium hydroxide and the calcium carbide from the outer edge inwards of one plate and from the center outwards on the succeeding plate, water atomizing nozzles arranged in the generator over at least the uppermost plate, said second generator being provided with another outlet for the acetylene produced and an outlet in its lower part for the dry calcium hydroxide produced, said lower outlet being equipped with a gas-tight sluice, both outlets for the acetylene produced in the separate stages being provided with pipes leading the individual acetylene streams into devices for dedusting and into cooling towers equipped with water spraying nozzles adapted to cool the acetylene to a desired temperature, said cooling towers being provided with outlets for the acetylene, said outlets being provided with pipes leading the acetylene into measuring devices of the flow meter type.

3. In an apparatus as claimed in claim 2, the combination of the measuring devices of the flow meter type with regulators adjusting the quantity of water sprayed by the water atomizing nozzles in the separate stages and adapted to decompose the calcium carbide according to the quantity of acetylene measured.

References Cited in the file of this patent

UNITED STATES PATENTS

| | | |
|---|---|---|
| 671,693 | Dickerson | Apr. 9, 1901 |
| 1,872,741 | Jane | Aug. 23, 1932 |
| 1,947,120 | Weibezahn et al. | Feb. 13, 1934 |
| 2,180,085 | Holler et al. | Nov. 14, 1939 |
| 2,343,185 | Holm et al. | Feb. 29, 1944 |

FOREIGN PATENTS

| | | |
|---|---|---|
| 153,229 | Australia | Apr. 25, 1938 |